(No Model.) 2 Sheets—Sheet 2.
E. C. BLACKSTONE.
SWATH TURNER.
No. 501,131. Patented July 11, 1893.
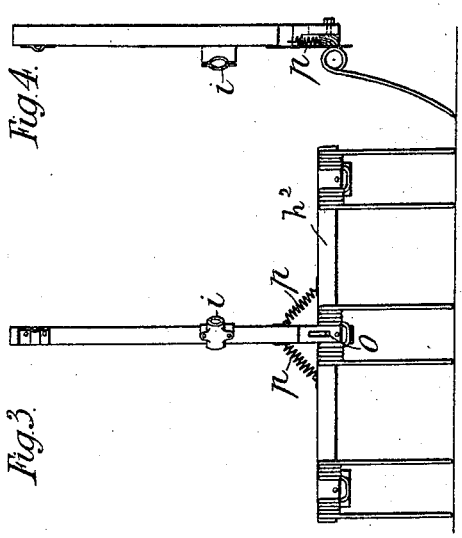
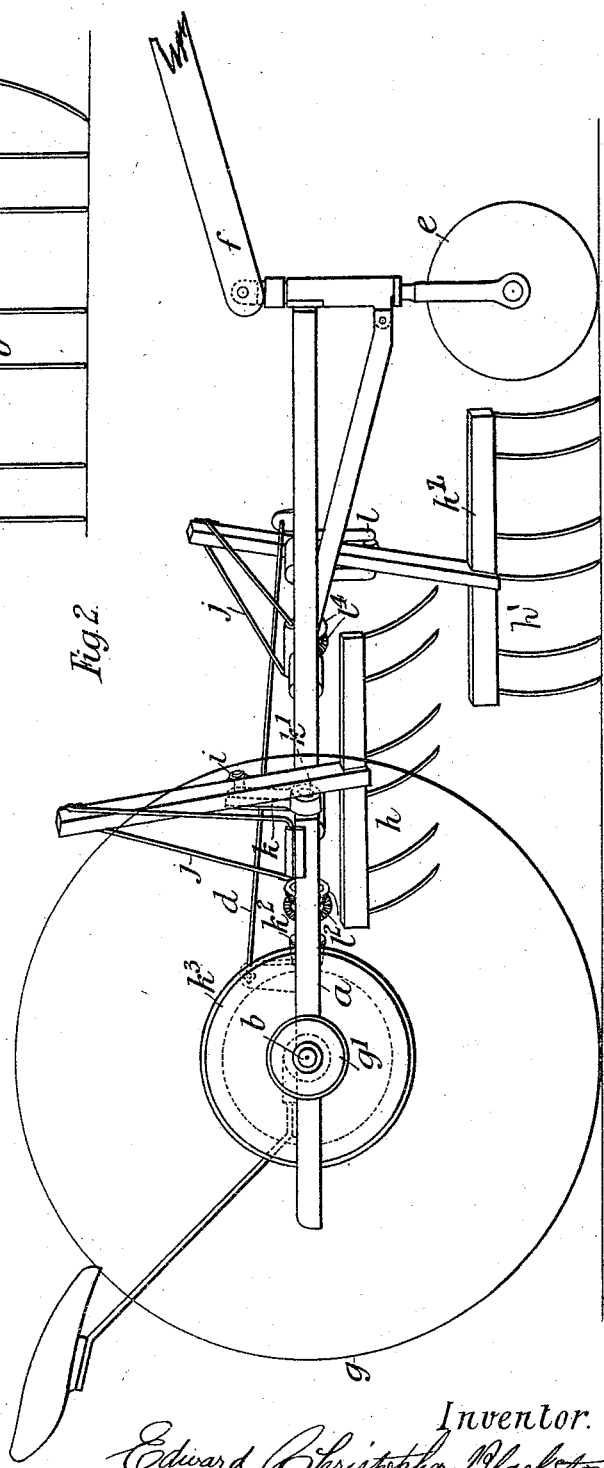
Witnesses.
Jeremiah Curight
John Cullin.
Inventor.
Edward Christopher Blackstone.
By his Attys
John J. Halsted & Son

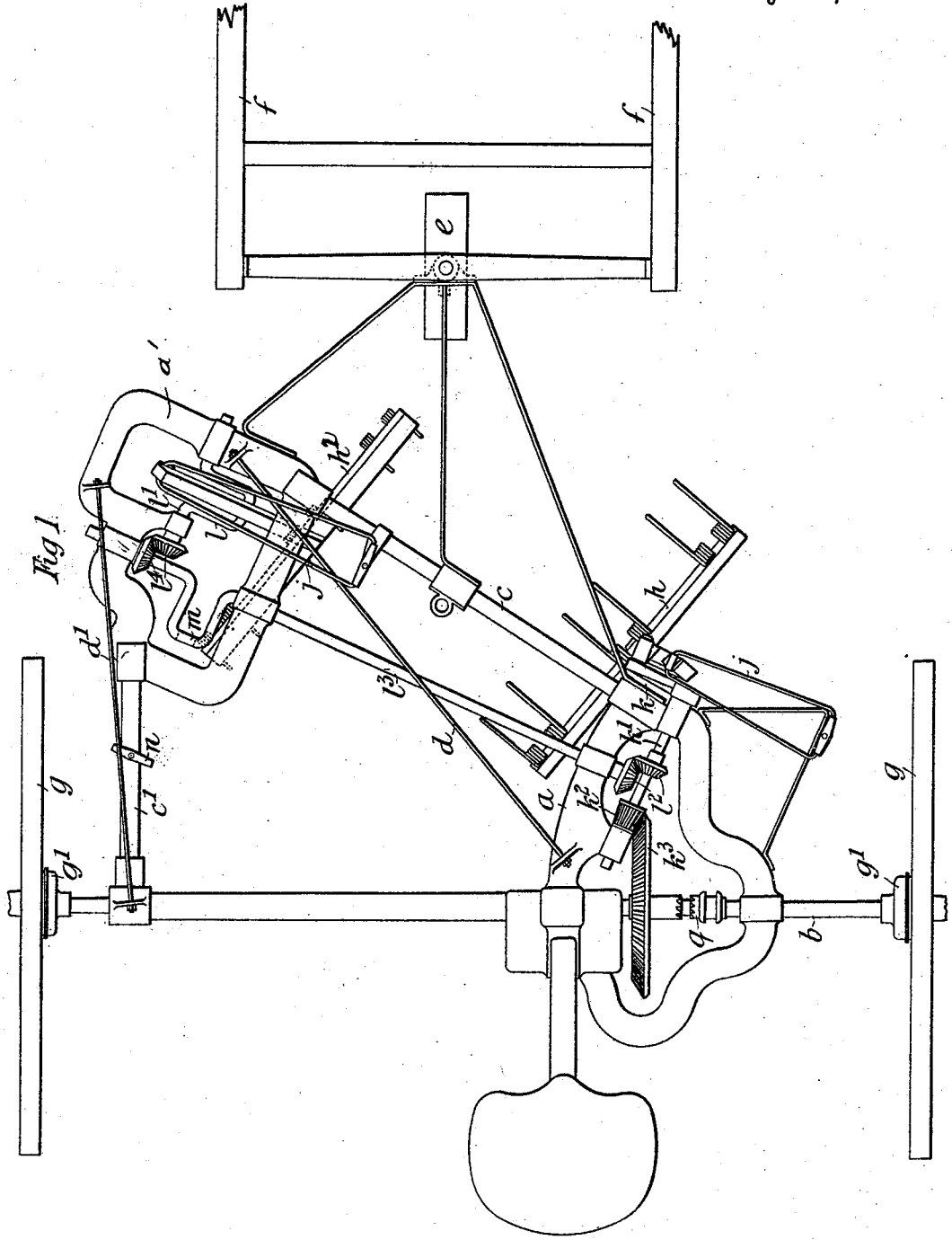

UNITED STATES PATENT OFFICE.

EDWARD CHRISTOPHER BLACKSTONE, OF STAMFORD, ENGLAND.

SWATH-TURNER.

SPECIFICATION forming part of Letters Patent No. 501,131, dated July 11, 1893.

Application filed August 9, 1892. Serial No. 442,543. (No model.) Patented in England July 24, 1891, No. 12,609.

*To all whom it may concern:*

Be it known that I, EDWARD CHRISTOPHER BLACKSTONE, a subject of the Queen of Great Britain, residing at Stamford, Lincoln, England, have invented a new and useful Swath-Turner, (patented in England, No. 12,609, dated July 24, 1891, and sealed), of which the following is a specification.

My invention relates to machines chiefly designed for turning clover when lying in swaths, but my improved machine is also applicable for turning swaths of hay and the like.

In carrying out my invention I provide a rake or fork which is arranged at an angle to a line drawn longitudinally or transversely through the machine, say at an angle of forty-five degrees thereto, the said fork or rake being oscillated by means of a crank or eccentric in a well known manner. In practice I prefer to employ two of such rakes in a single machine, so that the machine may turn two swaths simultaneously, the horse drawing the implement or machine walking between the swaths, and the traveling-wheels being placed sufficiently wide apart to run outside the swaths. Or the traveling-wheels may be placed nearer together, each running between two swaths. Motion is advantageously communicated to one of the forks by suitable gearing driven from the axle of the traveling-wheels, motion being imparted to the other fork by gearing from the gearing of the first mentioned fork. The traveling-wheels are connected with their axle by ratchets and pawls.

One of the chief advantages of my machine is that the clover or grass turned thereby still remains in swaths.

To enable my invention to be fully understood I will describe the same by reference to the accompanying drawings, in which—

Figure 1 is a plan of a machine provided with my improvements; and Fig. 2 is a side elevation of the same. Figs. 3 and 4 are front and side elevations respectively of one of the forks or rakes detached.

The framing of my machine, as shown in the drawings, comprises two main parts $a$, $a'$, the former of which is carried directly upon the driving-axle $b$ while the latter is connected to the same axle by the connecting bar $c'$, and to the part $a$, by the bar $c$, and the tie rod $d$, the front of the framing being supported upon a wheel $e$ to the standard of which the shafts for the horse are connected.

$g$, $g$ are the traveling-wheels which are mounted upon the axle $b$ and connected thereto by means of ratchet and pawl mechanism in a well known manner to enable either wheel to move independently of the other; such ratchet and pawl mechanism being arranged in the boxes $g'$, $g'$.

$h$, $h'$ are the rakes or forks by means of which the swaths are turned. Each of the said forks is provided with a bearing $i$, as shown in Figs. 3 and 4, by means of which the fork is connected to its crank while the upper end of each fork is connected by a link $j$ to a suitable point upon the framing. The fork $h$ is operated by the crank $k$, the shaft $k'$ of which carries a bevel pinion $k^2$ with which a bevel-wheel $k^3$ upon the driving-axle engages, while the fork $h'$ is driven by a crank $l$, the shaft $l'$ of which is operated from the shaft $k'$ through the medium of the bevel gear-wheels $l^2$, $l^2$, the shaft $l^3$ and the bevel-wheels $l^4$, $l^4$. As shown in the drawings the two forks are arranged at an angle of about forty-five degrees to the axis of the machine or to a line drawn longitudinally through the same, and as the cranks driving the said forks are not at a similar angle the forks are fixed angularly upon their shanks.

If desired, the forks may be arranged to work toward each other in order to throw two swaths into one. To enable this to be accomplished, I have shown the shaft $l^3$ as provided with a crank $m$ to which the fork $h'$ may be connected, and I have shown upon the bar $c'$ of the framing a socket $n$ to which the link $j$ of the fork $h'$ may be connected.

In order to prevent the forks from being damaged by coming into contact with any unevenness of the ground, I pivot the forks as indicated at $o$ in Figs. 3 and 4, and provide springs $p$, $p$ which normally retain the prongs in their proper positions, but which allow the bar $h^2$ of the forks to yield in the required manner when desired, by turning on such pivot' as need be.

In order that when the machine is traveling along the road the forks shall remain stationary, I advantageously arrange the bevel-wheel $k^3$ loosely upon its shaft, and provide for locking the same to the shaft when the machine is to be worked by means of a sliding-clutch $q$ which may be operated in any suitable manner to engage with teeth upon the boss of the wheel $k^3$.

It is to be understood that in using the machine one of the forks may be disconnected so that the machine will only turn one swath. It is also to be understood that motion may be communicated to the forks by any convenient mechanism, for instance, by means of sprocket chains and wheels.

Having now particularly described and ascertained the nature of my said invention and in what manner the same is to be performed, I declare that what I claim is—

1. In combination with the inclined fork $h$. and its driving mechanism, all located between the path of the wheels, the inclined shaft $l^3$ also between the path of the wheels and having a crank $m$, adapted to carry a fork for throwing its swaths into one with the swath of fork $h$, the bar $c'$, and socket $n$., all substantially as set forth.

2. In combination with the two crank shafts which severally serve to operate their respective forks in similar directions, a third crank shaft which is not only geared to drive one of said shafts, but which by means of its own crank is adapted also to actuate at option one of such forks to throw a swath in another direction.

3. In a swath-turner, a fork serving to throw a swath in a pre-determined line or row, a similar fork adapted to throw another swath parallel therewith, and a crank-shaft to whose crank this last named fork may be transferred and connected and whereby, upon such transfer and connection, the material gathered by the machine, may be thrown into one and the same swath, all substantially as set forth.

EDWARD CHRISTOPHER BLACKSTONE.

Witnesses:
   G. F. REDFERN,
   JOHN E. BOUSFIELD,
*Of the firm of G. F. Redfern & Co., 4 South Street, Finsbury, London, Patent Agents.*